3,513,471
Patented May 19, 1970

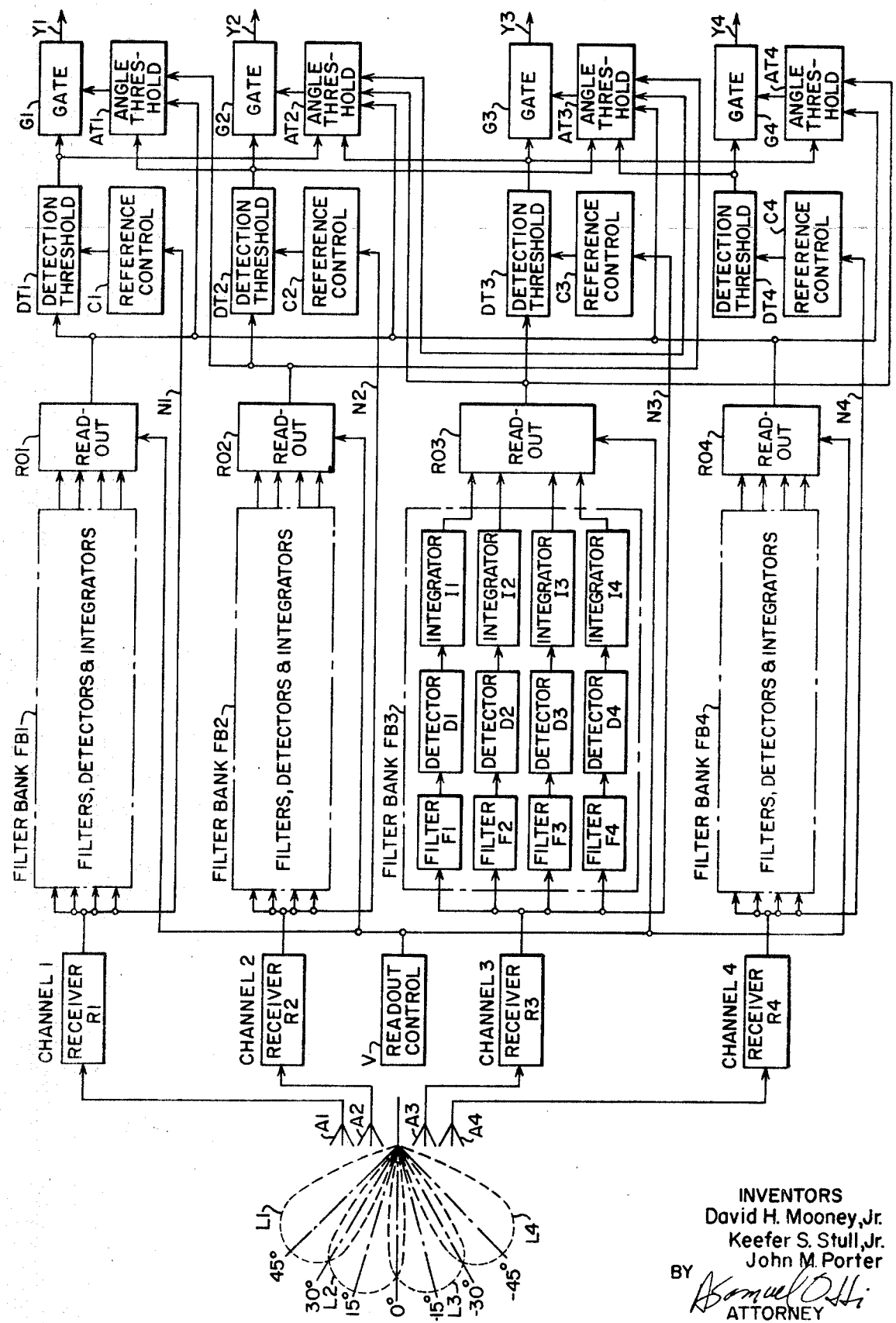

3,513,471
ANGLE SENSING SYSTEM
David H. Mooney, Jr., Severna Park, and Keefer S. Stull, Jr., Baltimore, Md., and John M. Porter, Annandale, Va., assignors to Westinghouse Electric Corporation, Pittsburgh, Pa., a corporation of Pennsylvania
Filed Oct. 26, 1967, Ser. No. 678,368
Int. Cl. G01s 9/22
U.S. Cl. 343—16        8 Claims

ABSTRACT OF THE DISCLOSURE

The present disclosure relates to an angle sensing system for locating the direction of a target about a given angle. A plurality of antennas are arranged to have a predetermined radiation pattern, each of the antennas being responsive to a target falling within its respective pattern. Each antenna supplies a sensing channel which includes a constant gain receiver, a threshold detector, which is responsive to signals above a given amplitude, a gate to translate a signal exceeding the given amplitude as a target indication in that channel unless inhibited and an inhibiting threshold to inhibit the target indication if an adjacent sensing channel has received a higher amplitude signal by a selected amount. The threshold level of the threshold detector may be adjusted according to noise appearing in the sensing channel.

BACKGROUND OF THE INVENTION

The present invention relates to angle sensing systems and, more particularly, to angle sensing systems for locating presence of a target about a given angle.

In certain radar applications, such as Doppler radar systems, target angle sensing is required in a quantized manner; that is, the location of a target of interest must be ascertained to be on one side or the other of a selected angle. It is not necessary that an exact angle measurement of the target location be given, but only that a determination of whether the target falls within a given zone or another is required. If a plurality of target receiving channels are utilized, the amplitude of the received target signal in a given channel may serve as an indication of its presence therein. However, the reception of high amplitude target signals may cause target indications to appear in several receiving channels thus causing uncertainty as to the particular zone in which the target appears. Moreover, the presence of noise in one or more of the receiving channels may cause false angle indications to be given. The false angle indication may be especially prevalent when weak target signals are received.

SUMMARY OF THE INVENTION

It is therefore an object of the present invention to provide a new and improved angle sensing system substantially independent of target signal strength and noise level in the system.

Broadly, the present invention provides a new and improved angle sensing system wherein a plurality of channels are utilized for receiving target signals. The amplitude of the target signals exceeding a predetermined threshold are compared in amplitude with target signals of the adjacent channels exceeding a given amplitude. A target indication is given from a particular channel when the amplitude of an adjacent channel exceeds the amplitude of the original channel by a given amount.

BRIEF DESCRIPTION OF THE DRAWING

The single figure is a block diagram showing the angle sensing system of the present invention.

DESCRIPTION OF THE PREFERRED EMBODIMENT

Referring to the figure, the angle sensing system of the present invention is shown including four sensing channels designated channels 1, 2, 3 and 4. Antennas A1, A2, A3 and A4 are utilized to supply the inputs for each of the channels 1, 2, 3 and 4, respectively. It should be understood, of course, that the showing of four channels is only exemplary and that other antennas and channels could be utilized in a particular system application.

The receiving antennas A1, A2, A3 and A4 are so designed and arranged to have radiation patterns L1, L2, L3 and L4, respectively, as indicated by the dotted line outlining the lobes of the radiation pattern. Each of the antennas A1, A2, A3 and A4 is thus particularly responsive to the reception of target signals along a given line of reception. Taking the center line of the antenna array as zero degrees and measuring the angle designation positively above this line and negatively below this line, it is found that the radiation pattern L1 for the antenna A1 is positioned about the +45° line and the pattern L2 positioned about the +15° line. The radiation pattern L3 for the antenna LA3 is positioned about the —15° line and the pattern L4 for the antenna A4 is positioned about the —45° line. The antenna A1 is thus primarily responsive to signals having a direction falling within the zone 30° and higher in positive direction and the antenna A2 is primarily responsive to signals falling within the zone between 0° and +30°. The antenna A3 is primarily responsive to signals falling within the direction of 0° and —30°, and the antenna A4 is primarily responsive to signals having a direction falling within the zone —30° and higher in the negative direction.

The angle sensing system as shown is adapted to receive target signals which are reflected from targets in response to radar pulses impinging thereon. The reflected signals from the target are received by the antenna array A1–A4 and it is desired to determine which zone of the composite antenna radiation pattern the target signal falls within. The angle sensing system is particularly adaptable for use with Doppler radar system wherein the targets to be sensed may be moving targets and the frequency of the received target system varies in accordance with the rate of these targets. Extraneous signals not falling within the desired frequency range of the sensing channels will be eliminated therefrom and will not affect the operation of the angle sensing system.

Each of the sensing channels 1, 2, 3 and 4 includes a receiver R1, R2, R3 and R4, respectively, which is coupled to the respective antennas A1, A2, A3 and A4. The target signals received by the respective antennas are applied to the respective receivers. The amplitude of a given target signal as seen by each of the antennas is dependent upon the particular direction of that target signal. The receivers R1, R2, R3 and R4 are designed to have a substantially constant gain independent of signal strength applied to the input thereto. In this manner, the amplitude information included in the target signal and applied at the input of the receiver is retained at the output of the receivers and is indicative of the particular target signal strength in each of the sensing channels. In the receivers R1, R2, R3 and R4, the target signals as applied thereto are heterodyned to an intermediate frequency signal whose amplitudes vary according to the input amplitude of the target signals to the respective receivers.

The respective outputs of the receivers R1, R2, R3 and R4 are applied to a filter bank FB1, FB2, FB3 and FB4 in the respective channels. Each of the filter banks includes a plurality of filter channels wherein each of the filter channels includes a filter, a detector and an integrator tandemly connected in that order. This is better shown for the channel 3 wherein the filter bank FB3 is shown including four filter channels; however, it should be understood that additional filter channels could be utilized and only four are shown herein for simplicity. In the filter bank FB3, the output of the receiver R3 is applied to a filter F1, F2, F3 and F4, respectively, in the filter channels. The filters F1–F4 . . . are selected to have a composite bandwidth encompassing the frequency range of the output of the receivers and therefore encompassing a frequency range in which targets of interest should fall. The filters F1, F2, F3, F4 . . . thus are selected to have adjacent band passes starting at a given band pass and progressing to the end of the composite bandwidth to permit the translation of signals falling within the range of interest.

The outputs of the filters F1, F2, F3 and F4 are applied respectively, to detectors D1, D2, D3 and D4, which detect the alternating signals from the filters and convert these to detected unidirectional signals. These signals are applied, respectively, to the integrators I1, I2, I3, and I4. The detected signals from the respective detectors D1, D2, D3 and D4 are thus integrated in the respective integrators I1–I4 and appear as integrated outputs from the integrators I1–I4 and are applied to a rearout circuit RO3. The output of the filter bank FB1, FB2 and FB4, respectively, are supplied to readout circuits RO1, RO2 and RO4, respectively. The filter banks FB1, FB2, and FB3 are substantially identical to the filter bank FB3 and are operative in a similar manner. The filter banks FB1–FB4 must serve the function of eliminating signals from the receivers which do not fall within the range of frequencies indicating targets of interest being received and, moreover, serve to enhance the signal-to-noise ratio of the target signals as received through the detection and integration process. The output signals applied to the respective readout circuits RO1–RO4 thus have an enhanced signal-to-noise ratio as compared to the input target signals as received by the antennas A1–A4.

The reading out operation of the readout circuits RO1, RO2, RO3 and RO4 is controlled by a readout control V which supplies input signals to each of the readout circuits so that they begin their readout operation at the same time and remain in synchronism. Thus, the readout circuits read out the first filter channel of each of the filter banks at the same time and the output of the second filter bank at the same time, etc. Hence, in time sequence, the readout RO3, for example, first applies the output of the integrator I1 to a threshold detector DT3; then reads out the output of the integrator I2 to the threshold detector DT3; then the output of the integrator I3 to the detector threshold DT3, etc. In time correspondence to this, the outputs of the first, second and third, etc., integrators of the filter banks FB1, FB2 and FB4 are sequentially applied to the corresponding detection thresholds DT1, DT2 and DT4 of sensing channels 1, 2 and 4. The readout circuits RO1, RO2, RO3 and RO4 sequentially read out each of the filter channels until all of the filter channels have been scanned. Then, the readout circuits are reset for the next readout portion of the sensing operation.

The sequentially outputted signals from the readout circuits RO1–RO4 vary in amplitude according to the amplitude of the signals as translated by the respective filter channels. The amplitude is dependent upon the amplitude of the target signal as applied to the respective receiving antennas A1–A4 falling within a particular band of frequencies as to be translated through a given filter of the respective filter banks FB1–FB4.

The detection thresholds DT1–DT4 have adjustable threshold levels with a particular threshold having to be exceeded before a signal will be translated therethrough. The threshold levels of the detection thresholds DT1–DT4 are controlled via reference controls C1–C4, respectively, in each of the sensing channels. The reference controls C1–C4 receive as inputs the output of the respective receivers R1–R4 via leads N1, N2, N3 and N4, respectively. The signals appearing on the leads N1–N4 include a substantial portion of the noise included in the original input signals into each of the sensing channels as compared to the noise content of the signals applied to the detection thresholds DT1–OT4. The reference controls C1–C4 are responsive to the noise content of the information appearing on the leads N1–N4 and provide an output in response thereto which is supplied to the detection thresholds DT1–DT4, respectively, to adjust the threshold level of the detection thresholds DT1–DT4 in response thereto. Hence, as the noise increases in a given channel and appears on leads N1–N4, the threshold level of the respective detection threshold DR1–DT4 is raised in amplitude by the reference controls C1–C4. Thus, if a particular one of the channels 1–4 is noisy, the threshold level of the detection threshold in that channel is relatively high. However, if another of the channels is relatively free of noise, the detection threshold corresponding thereto will be set at a relatively low amplitude level to permit the signals to be translated therethrough even though they are of a relatively low amplitude level as compared to that of a noisy channel.

Whenever a signal of sufficient amplitude is supplied to the input of the detection thresholds DT1–DT4, the threshold thereof is exceeded and signal translated therethrough to respective gate circuits G1–G4 for the respective sensing channels. The signal having an amplitude exceeding the threshold level of respective detection thresholds DT1–DT4 normally passes through the respective gates G1–G4 to appear as a target indication output at the outputs Y1, Y2, Y3, and Y4, respectively, thereof unless otherwise inhibited. Whenever a target output appears at the output Y1–Y4 this is indicative that a target signal has been received which is of interest and falls within the particular zone as defined for each of the sensing channels 1–4 as described above.

In the presence of high amplitude target signals as received by the antennas A1–A4, it is probable that sufficiently high amplitude signals will be applied to the detection thresholds DT1–DT4 of more than one of these to give an output therefrom which would mean that target indications may be provided for more than one of the gate outputs Y1–Y4. If, however, the amplitude level appearing in one of the sensing channels is larger than another channel, this will give an inaccurate or a less than satisfactory angle indication for the target being sensed. Thus, for example, assume that the signals appearing in channels 1 and 2 are of sufficient amplitude to exceed the threshold levels of the detection thresholds DT1 and DT2. Gate outputs will be provided at Y1 and Y2 even though the amplitude of signals appearing in channel 1 might exceed by a large margin the amplitude of signals in channel 2.

To prevent such ambiguous results, angle thresholds AT1, AT2, AT3 and AT4, respectively, are provided for each of the sensing channels to inhibit the gates G1–G4 from outputting a target indication signal until the proper conditions are fulfilled. Each of the angle thresholds AT1–AT4 in each of the channels receives an input after the detection threshold from the adjacent channels to establish that an amplitude comparison is to be made and also receives the input from before the detection threshold in that channel, which is indicative of the amplitude of the signal being applied to the detection threshold in that channel, and also as input signals from before the detection thresholds of adjacent channels which are also indicative of the amplitude of the signals appearing in adjacent channels. Thus, the angle threshold AT1 in channel 1 receives as inputs thereto a comparing input from the adjacent channel detection threshold DT2 when this detection threshold is exceeded and then also an input from the readout RO1 and the readout RO2. The angle threshold AT2 in channel 2 receives comparing signals from the output of the detection thresholds DT1 and DT3 and also amplitude bearing signals from the readout circuits RO2 in channel 2 and RO1 and RO3 in channels 1 and 3, respectively. The angle threshold AT3 in channel 3 receives a comparing input from the detection thresholds DT2 and DT4 and also from the readout circuits RO3, RO2 and RO4. The angle threshold AT4 in channel 4 receives a comparing input signal from the detection threshold DT3 and inputs from the readout circuits RO4 and RO3.

The operation of the angle thresholds AT1–AT4 may be defined as providing an inhibiting signal to its respective gate circuit whenever the detection threshold in an adjacent channel is exceeded and also a comparison of the amplitudes shows the signal in an adjacent sensing channel to exceed the amplitude in its sending channel by a predetermined amplitude. This amplitude reference may be set to be a predetermined number of decibels. It is desirable to make threshold comparison in the angle thresholds to be as low as possible so that the uncertainty region between angle zones will be as small a region as possible. However, the limit of the threshold is determined by the noise which appears at the filter bank output since the noise fluctuations can mask small difference in signal amplitude. It has been found that only a few decibels difference in comparison is required to provide a useful level of operation for the angle thresholds AT1–AT4.

As an example of the operation, assume that a target signal appears in sensing channel 3 to trigger the detection threshold DT3 to supply an output to the gate G3. Also assume that the signal strength in channels 2 and 4 is sufficient to exceed the thresholds of threshold detectors DT2 and DT4. A comparison is then made in the angle threshold AT3 in response to a comparing signal from DT2 to compare the output of the readout RO3 for each of the filter channels with the output of the readout RO2 for each of the filter channels of channel 2 and with the output of the readout RO4 of the channel 4 in response to a comparing signal from DT4. Assume that the output of the readout from the readout RO4 is smaller or does not exceed the amplitude of the output from the readout RO3 by the given amount. Therefore, a comparison of the channel 3 and channel 4 amplitude outputs will not cause the angle threshold AT3 to output and inhibit signals to the gate G3. However, assume that the output from the readout RO2 exceeds the output of the readout RO3 by the given amount which causes the angle threshold AT3 to provide an inhibit signal to the gate G3. The inhibit signal thus blocks the gate G3 from translating target indication signal to the output Y3 thereof.

Now considering sensing channel 2, a comparison of the amplitudes of adjacent channel 3 with the channel 2 amplitude is made in the angle threshold AT2. Since the amplitude in channel 2 is larger than the amplitude in channel 3 this will not cause the angle threshold AT2 to inhibit. Also assume that the threshold of the detection threshold DT1 in channel 1 is not exceeded. Therefore, the angle threshold AT2 will not provide an inhibit signal to the gate G2 and thus the gate G2 translates the target indication signal to the output Y2. This indicates that a target has been sensed by channel 2, and the target location falls between zero degrees and +30° according to the radiation pattern shown in the figure.

The target sensing system is also operative to determine the angle zone of a relatively weak target signal which is of sufficient amplitude to trigger the detection threshold in that sensing channel but not of sufficient amplitude to trigger the threshold of adjacent channels. This will give a direct target indication from the responding channel without an amplitude comparison being in the responsive channel, since no comparing signals are provided to the angle threshold of that channel from adjacent channels. Thus, a target indication will be given in the responding channel without inhibition from adjacent channels.

If a target signal should appear at the crossover point between two zones, such as the angle 0°, ±30°, two adjacent channels will give output target indications with both the detection thresholds being exceeded. Thus, for example, if a target is received by the antenna array at an angle of approximately +30°, the threshold levels of both the detection thresholds DT1 and DT2 will be triggered to provide output therefrom to the respective gates G1 and G2. Amplitude comparison in the channel 1 by the angle threshold AT1 will not provide, however, an inhibit signal to the gate G1 since the amplitude of the signal appearing in the channel 2 is substantially the same as that appearing in the channel 1. Similarly, the angle threshold AT2 in channel 2 will not provide an inhibit output since the amplitudes in channel 1 and channel 2 are of insufficient difference to cause an inhibit output. Thus, both the gates G1 and G2 will translate target indicating signals at the outputs Y1 and Y2 thereof to indicate that a target has been received substantially near to the crossover point between radiation patterns of the channels 1 and 2 at approximately +30°.

Since the antennas A1–A4 are arranged to be directive, it is possible that noise interference may be high in one or more channels while being relatively free from noise in other of the channels. As previously explained, as the magnitude of noise increases in a particular channel, the threshold level of the detection threshold in that channel is increased to prevent false target indications being given in response to noise rather than actually received target information. Also, by the particular arrangement as shown in the figure, a highly noisy channel adjacent to a relatively clear channel will not interefre with the clear channel making a target indication when a target is received in that channel. This is the case since the threshold level of the noisy channel is increased in response to the noise appearing in that channel. Thus the noisy channel will have a relatively high threshold level while the clear channel will have a low threshold channel. For an amplitude comparison in the angle threshold of the clear channel to take place, it is necessary that the detection threshold of the noisy channel be exceeded so that the angle threshold of the adjacent clear channel may be activated and an amplitude comparison be made. If the threshold level of the detection threshold of the noisy channel is not exceeded, no amplitude comparison is made in the clear channel, and, therefore, the clear channel will not be inhibited by the noisy channel and will provide a target indication therethrough even though adjacent channels may be very noisy.

Therefore, it can be seen that the present invention provides angle sensing system, which is adaptable to Doppler radar systems, that may sense the angle zone of incoming target signals with a relatively high degree of certainty. Moreover, the target angle sensing operation may still be performed even in the presence of interference noise in one or more of the sensing channels and the sensing system is operative on both weak and strong target signals to identify the particular zone of these target signals. Also, the system requires only a minimum of hardware for performing the necessary comparing and inhibiting functions to insure certainty in the angle sensing for a received target.

Although the present invention has been described with a certain degree of particularity, it should be understood that the present disclosure is made only by way of example and that numerous changes in the details of construction and the combination and arrangement of parts, elements and components can be resorted to without departing from the spirit and scope of the present invention.

We claim as our invention:

1. An angle sensing system for locating the direction of received target signals comprising:
   a plurality of antennas having a predetermined radiation pattern and being arranged so that each is responsive to target signals having a direction falling within the respective patterns; and a sensing channel for each of said antennas, each of said channels including, receiving means for receiving said target signals from the respective of said antennas and providing a first output indicative of the amplitude of said target signals applied thereto, threshold means having a selected threshold level and responsive to said first output to provide a second output when said first output exceeds said selected threshold level, gating means to translate said second output to provide a target indication for that channel unless inhibited, and inhibiting means to inhibit said gating means from providing a target indication from that channel when the amplitude of a first output from an adjacent of said channels is greater than the amplitude of said first output of that channel by a given amount.

2. The system of claim 1 wherein:
said receiving means having a substantially constant gain independent of target signal strength.

3. The system of claim 2 wherein:
said sensing channel including,
threshold adusting means responsive to said first output for selecting the threshold level of said threshold means in response to the noise present in that channel.

4. The system of claim 3 wherein:
said sensing channel including,
a filter bank for receiving said first output and improving the signal-to-noise ratio thereof to be applied to said threshold means.

5. The system of claim 4 wherein:
said filter bank having a bandwidth encompassing the frequency range of said first output indicative to target signals to be sensed, and including a plurality of filter channels each including a filter encompassing a portion of said bandwidth, a detector for detecting the output of said filter and an integrator for integrating the detected output, readout means for reading out the respective outputs of each of said filter means as said first output.

6. The system of claim 5 including:
control means for causing said readout means in each of said sensing channels to readout sequentially the respective filter channels in each of said sensing channels.

7. The system of claim 3 wherein:
said inhibiting means receiving said first output from the sensing channel in which it is included and the first output from each of the adjacent sensing channels and being operative to compare the first output of the adjacent sensing channels with said first output of its sensing channels and provide an inhibiting output therefrom to inhibit said gating means if the first output from an adjacent sensing channel is greater than said first output of its channel by a given amount.

8. The system of claim 7 wherein:
said inhibiting means receiving said second outputs from said threshold means of adjacent sensing channels to activate said inhibiting means to make the comparison between said first outputs.

References Cited
UNITED STATES PATENTS

| | | | |
|---|---|---|---|
| 3,149,333 | 9/1964 | Campbell | 343—17.1 |
| 3,271,769 | 9/1966 | Trafford et al. | 343—17.1 |
| 3,312,969 | 4/1967 | Halsted | 343—17.1 XR |

RICHARD A. FARLEY, Primary Examiner

J. P. MORRIS, Assistant Examiner